United States Patent [19]

Terano et al.

[11] Patent Number: 4,816,433

[45] Date of Patent: Mar. 28, 1989

[54] SOLID CATALYST COMPONENT FOR THE POLYMERIZATION OF OLEFINS AND AN OLEFIN POLYMERIZATION CATALYST

[75] Inventors: Minoru Terano; Atsushi Murai; Masuo Inoue; Katsuyoshi Miyoshi, all of Kanagawa, Japan

[73] Assignee: Toho Titanium Co., Ltd., Tokyo, Japan

[21] Appl. No.: 69,151

[22] Filed: Jul. 2, 1987

[51] Int. Cl.$^4$ ............................................. C08F 4/64
[52] U.S. Cl. .................................... 502/127; 502/125; 526/124
[58] Field of Search ............................... 502/127, 125

[56] References Cited

U.S. PATENT DOCUMENTS

| | | | |
|---|---|---|---|
| 4,460,701 | 7/1984 | Terano et al. | 502/127 X |
| 4,547,476 | 10/1985 | Terano et al. | 502/127 |
| 4,640,906 | 2/1987 | Terano et al. | 502/127 X |
| 4,659,792 | 4/1987 | Kashiwa et al. | 502/127 X |
| 4,686,200 | 8/1987 | Terano et al. | 502/127 X |

*Primary Examiner*—Patrick P. Garvin
*Attorney, Agent, or Firm*—Birch, Stewart, Kolasch & Birch

[57] ABSTRACT

A solid catalyst component prepared by washing a solid substance, which has been obtained by reacting diethoxymagnesium (a) suspended in an alkylbenzene (b) with titanium tetrachloride (c) in an amount less than ½ of the alkylbenzene (b) in a ratio by volume and a phthalic diester (d) at a temperature within the range of 80°–135° C., with an alkylbenzene, and thereafter reacting the solid substance in a presence of an alkylbenzene (b) with titanium tetrachloride (c) in an amount less than ½ of the alkylbenzene (b) in a ratio by volume as well as an olefin polymerization catalyst comprising (A) the solid catalyst component specified above, (B) a silicon compound of the general formula:

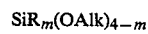

$SiR_m(OAlk)_{4-m}$ wherein R is a group selected from an alkyl group, a cycloalkyl group, and aryl group and vinyl group, Alk is an alkyl group and m is 0 or an integer of 1–3, with the proviso that when R is an alkyl group, R may be identical with Alk and when m is 1, 2 or 3, the groups and/or the Alk groups may respectively be identical or different, and (C) an organoaluminum compound. This catalyst is capable of exhibiting a high polymerization activity combined with a high stereospecific performance and producing stereoregular olefin polymers in a high yield.

13 Claims, No Drawings

SOLID CATALYST COMPONENT FOR THE POLYMERIZATION OF OLEFINS AND AN OLEFIN POLYMERIZATION CATALYST

BACKGROUND OF THE INVENTION

1. Field of the Invention

The present invention relates to a high performance solid catalyst component and an olefin polymerization catalyst using the solid catalyst component. More particularly, the present invention relates to a solid catalyst component derived from diethoxymagnesium, titanium tetrachloride, a phthalic diester in the presence of an alkylbenzene according to a specific procedure and an olefin polymerization catalyst prepared from the solid catalyst component, a specific silicon compound and an organoaluminum compound, the catalyst being capable of exhibiting a high polymerization activity combined with a high stereospecific performance and producing stereoregular olefin polymers in a high yield.

2. Description of the Prior Art

Various kinds of solid catalyst components comprising a dialkoxymagnesium, titanium tetrachloride and an electron donor have been developed and proposed in the polymerization olefins.

In U.S. Pat. No. 4,414,132, for example, there is disclosed the use of a large amount of an organoaluminum compound at the time of polymerization of olefins to enhance activity of such catalysts as well as a process for preparing a catalyst component by bringing a dialkoxymagnesium obtained according to a specific operation into contact with a tetravalent titanium compound in the presence of a halogenated hydrocarbon and an electron donor with the purpose of overcoming drawbacks seen in the prior art processes that stereospecific property of the resultant polymers is deteriorated when hydrogen is added to the polymerization system to control the molecular weight of the produced polymers. According to Example 2 of this patent concretely illustrating the process for preparing the catalyst component, it is analyzed that the catalyst component is obtained by suspending a dialkoxymagnesium in carbon tetrachloride, adding ethyl benzoate and titanium tetrachloride at 75° C., stirring the suspension for 2 hours while maintaining the temperature at 75° C., isolating the resultant solid matter and washing it 5 times with iso-octane, suspending the solid matter in titanium tetrachloride at 80° C., stirring the suspension for 2 hours and then washing the solid matter 5 times with iso-octane. Example 1 of this patent illustrates the use of an olefin polymerization catalyst wherein the solid catalyst component is combined with triethylaluminum.

However, the solid catalyst component prepared according to the process illustrated in U.S. Pat. No. 4,414,132 cannot be said to be satisfactory in its performance with respect to polymerization activity, yield of stereoregular polymers and durability of the activity when used together with other catalyst ingredients for the polymerization of olefins.

With a view to solving such problems seen in the prior art process for the polymerization of olefins, the present inventors developed a new olefin polymerization catalyst in U.S. Pat. No. 4,640,906 and succeeded in furnishing the catalyst with excellent performance for achieving a high level of polymerization activity and durability of such high activity. In this patent, the catalyst is prepared by adding a dialkoxymagnesium and a diester of an aromatic dicarboxylic acid to a halogenated hydrocarbon to prepare a solid catalyst component and combining it with a piperidine derivative and an organoaluminum compound. In this new catalyst, however, there was still a room for improving stereospecific property and bulk density of the resultant polymer.

Under the circumstances, there is still a great demand for developing a new olefin polymerization catalyst which has an extremely enhanced stereospecific performance and affords a high bulk density.

BRIEF SUMMARY OF THE INVENTION

Accordingly, it is an object of the present invention to provide a new solid catalyst component for olefin polymerization catalyst which has an extremely high stereospecific performance and affords a high bulk density.

It is another object of the present invention to provide a new olefin polymerization catalyst which overcomes drawbacks of the prior art catalysts incurring problems of pollution and odor in the resultant polymers.

It is still another object of the present invention to provide a new solid catalyst component for the olefin polymerization catalyst, which is obtained according to a series of specific but simple treatments.

It is further object of the present invention to use the catalyst for the production of highly stereoregular olefin polymers.

Other and further objects, features and advantages of the present invention will be apparent more fully from the following description.

As a result of extensive research made for developing a new olefin polymerization catalyst overcoming the disadvantages of the prior art catalysts, it has now been found that a high performance new solid catalyst component can be obtained from diethoxymagnesium according to specific treatments conducted in a special order of succession under specific conditions and that such new improved olefin polymerization catalyst is prepared by combining the new solid catalyst component with a specific silicon compound and an organoaluminum compound. The present invention has been accomplished on the basis of the above finding.

DETAILED DESCRIPTION OF THE INVENTION

In accordance with one embodiment of the present invention, there is provided a solid catalyst component for olefin polymerization catalyst prepared by washing a solid substance, which has been obtained by reacting diethoxymagnesium (a) suspended in an alkylbenzene (b) with titanium tetrachloride (c) in an amount less than ½ of the alkylbenzene (b) in a ratio by volume and a phthalic diester (d) at a temperature within the range of 80°–135° C., with an alkylbenzene which may be identical with or different from the alkylbenzene (b), and thereafter reacting the solid substance in the presence of an alkylbenzene (b) with titanium tetrachloride (c) in an amount less than ½ of the alkylbenzene (b) in a ratio by volume.

In accordance with another embodiment of the present invention, there is provided an olefin polymerization catalyst which comprises:

(A) the above specified solid catalyst component,
(B) a silicon compound of the general formula:

$$SiR_m(OAlk)_{4-m} \quad (I)$$

wherein R is a group selected from an alkyl group, a cycloalkyl group, an aryl group and vinyl group, Alk is an alkyl group and m is 0 or an integer of 1-3, with the proviso that when R is an alkyl group, R may be identical with Alk and when m is 1, 2 or 3, the R groups and/or the Alk groups may respectively be identical or different, and (C) an organoaluminum compound.

Merely by the term "polymerization" is meant herein any type of the polymerizations including homopolymerization and copolymerization of olefins as well as any mode of the polymerization including gas or bulk polymerization in the absence of any polymerization solvent and slurry or solution polymerization in the presence of a polymerization solvent.

The alkylbenzene (b) used in the present invention for suspending the diethoxymagnesium (a) has one or more straight chain or branched chain alkyl groups on the benzene ring. Illustrative of the alkylbenzene (b) are, for example, toluene, xylene, ethylbenzene, propylbenzene, isopropylbenzene and trimethylbenzene. The use of toluene or xylene is preferable.

The phthalic diester (d) used in the present invention is generally represented by the following general formula:

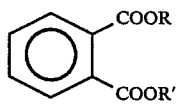
(II)

wherein R and R' may be the same or different and each represents a $C_1$-$C_{18}$ alkyl group which may be branched at any desired position. Preferably, R and R' are $C_2$-$C_{12}$ alkyl groups which may be branched at any desired position. Illustrative of the preferable diester are, for example, dimethyl phthalate, diethyl phthalate, dipropyl phthalate, diisopropyl phthalate, dibutyl phthalate, diisobutyl phthalate, diamyl phthalate, diisoamyl phthalate, dihexyl phthalate, dioctyl phthalate, di-isooctyl phthalate, didecyl phthalate, didodecyl phthalate, dihexadecyl phthalate, methyl ethyl phthalate, methyl propyl phthalate, methyl butyl phthalate, methyl isobutyl phthalate, ethyl propyl phthalate, ethyl butyl phthalate, ethyl isobutyl phthalate, propyl butyl phthalate, propyl isobutyl phthalate, propyl amyl phthalate, butyl amyl phthalate, ethyl hexyl phthalate, butyl hexyl phthalate, methyl octyl phthalate, ethyl octyl phthalate, propyl decyl phthalate, octyl dodecyl phthalate and ethyl hexadecyl phthalate.

The silicon compound (B) used in the present invention can be represented by the general formula:

$$SiR_m(OAlk)_{4-m} \quad (I)$$

wherein R is a group selected from an alkyl group, a cycloalkyl group, an aryl group and vinyl group, Alk is an alkyl group and m is 0 or an integer of 1-3, with the proviso that when R is an alkyl group, R may be identical with Alk and when m is 1, 2 or 3, the R groups and/or the Alk groups may respectively be identical or different.

When m is 0, the silicon compound is a tetraalkoxysilane wherein 4 alkoxy groups may be the same or different.

The alkyl group in this compound may be linear or branched and generally has 1-8, preferably 1-4 carbon atoms. Preferable examples of the alkyl group include methyl, ethyl, propyl, isopropyl, n-butyl and isobutyl. The cycloalkyl group generally has 5-8, preferably 5-6 carbon atoms. Preferable examples of the cycloalkyl group include cyclopentyl and cyclohexyl. The aryl group generally includes phenyl or naphthyl group which may carry one or more ring substituents. Illustrative of such aryl group are phenyl, tolyl, xylyl and naphthyl. When m is 2, the two R groups and the two Alk groups may be respectively same or different. When m is 1 or 3, the three R groups or the three Alk groups may be respectively same or different. Preferably, the plural R or Alk groups are identical. More precisely, the silicon compound includes tetraalkoxysilanes, phenylalkoxysilanes, alkylalkoxysilanes, phenylalkylalkoxysilanes, cycloalkylalkoxysilanes and cycloalkylalkylalkoxysilanes. Illustrative of the tetraalkoxysilane are, for example, tetramethoxysilane, tetraethoxysilane, tetrapropoxysilane and tetrabutoxysilane. Illustrative of the phenylalkoxysilane are, for example, phenyltrimethoxysilane, phenyltriethoxysilane, phenyltripropoxysilane, phenyltriisopropoxysilane, phenyltributoxysilane, diphenyldimethoxysilane, diphenyldiethoxysilane and triphenylmethoxysilane. Illustrative of the alkylalkoxysilane are, for example, trimethoxyethylsilane, trimethoxymethylsilane, triethoxymethylsilane, ethyltriethoxysilane and ethyltriisopropoxysilane. Besides these compounds, examples of the silicon compound includes phenylmethyldimethoxysilane, cyclohexyltriethoxysilane, cyclohexylmethyldiethoxysilane and dicyclohexyldimethoxysilane.

The organoaluminum compound (C) used in the present invention can generally be represented by the following general formula:

(III)

wherein R is a $C_1$-$C_8$ alkyl group, Q and Q' may be the same or different and each represents R or X, and X is a halogen atom. Thus, the organoaluminum compound includes a trialkylaluminum, a dialkylaluminum halide and an alkylaluminum dihalide as well as a mixture of these aluminum compounds. Preferable examples of the organoaluminum compound include triethylaluminum, tripropylaluminum, triisopropylaluminum, tributylaluminum, triisobutylaluminum, diethylaluminum chloride, diethylaluminum bromide, diisopropylaluminum chloride, dibutylaluminum chloride, ethylaluminum dichloride, propylaluminum dichloride and butylaluminum chloride. Particularly preferable are trialkylaluminums with triethylaluminum and triisobutylaluminum being most preferable.

In the preparation of the solid catalyst component, the titanium tetrachloride (c) is usually used in an amount of at least 1.0 g per gram of the diethoxymagnesium (a) but less than ½ of the alkylbenzene (b) in a ratio by volume. The phthalic diester (d) is used usually in an axount of 0.1-1 g per gram of the diethoxymagnesium (a). If the above proportions are greater or smaller than the above ranges, the polymerization activity and the yield of stereoregular polymers will be reduced but the polymerization itself will proceed without any trouble.

The alkylbenzene (b) can be used in any desired amount but is preferably used in an amount capable of forming a flowable suspension.

The solid catalyst component of the present invention is prepared according to a specific process from the essential ingredients (a), (b), (c) and (d). At the outset, the diethoxymagnesium is suspended in the alkylbenzene (b) and then reacted at a temperature within the range of 80°–135° C. with the titanium tetrachloride (c) in an amount less than ½ of the alkylbenzene (b) in a ratio by volume and the phthalic diester (d) in a given amount both added at room temperature to the suspension. The resultant solid substance is washed with an alkylbenzene which may be the same as or different from the alkylbenzene (b) used for the preparation of the suspension. The solid substance is then reacted in the presence of the alkylbenzene (b) with titanium tetrachloride (c) to obtain the solid catalyst component. According to another embodiment of this process, the diethoxymagnesium is suspended in the alkylbenzene (b), and only titanium tetrachloride (c) in an amount less than ½ of the alkylbenzene (b) is added to the suspension at room temperature. After elevating the temperature of the suspension above 80° C., the phthalic diester (d) in a given amount is added to the suspension and thereafter the mixture is allowed to react together at a temperature within the range of 80°–135° C. Usually, the above reaction is conveniently carried out in a confined reaction container equipped with a stirrer and a means for heating and cooling the reaction container externally. It is preferable to conduct the operation for suspending the diethoxymagnesium (a) in the alkylbenzene (b) at room temperature since the operation itself is easy and no particular device is necessary.

The reaction between the suspension of the diethoxymagnesium (a) and the titanium tetrachloride (c) and the phthalic diester (d) is carried out at a temperature within the range of 80°–135° C. usually for a period of 10 minutes to 10 hours. If the reaction temperature for contacting the suspension with the titanium tetrahalide is lower than 80° C., the bulk density of the polymer will significantly be reduced and the yield of a stereoregular polymer will also be decreased slightly. On the other hand, the upper limit of the reaction temperature, 135° C., is established in consideration of the boiling point of titanium tetrachloride. No particular limitation exists for the reaction time, but the reaction is continued until it is finished. Usually, a period of time from 10 minutes to 10 hours will be sufficient for completion of the reaction. The solid substance obtained by this reaction is separated from the reaction liquid and washed with an alkylbenzene which may be identical with or different from the alkylbenzene (b). Prior to the washing with the alkylbenzene, the solid substance may be washed preliminarily with any suitable inert organic solvent other than the alkylbenzene. Preferable examples of the inert organic solvent include benzene and aliphatic hydrocarbons such as n-heptane. After the washing treatment, the solid substance is reacted in the presence of the alkylbenzene (b) with further titanium tetrachloride (c) in an amount less than ½ of the alkylbenzene (b) in a ratio by volume. No particular limitation exists in temperature for this reaction but the reaction is preferably carried out at a temperature within the range of 60°–135° C. for a period of 10 minutes to 10 hours. A preferable temperature range for the above reactions is suitably chosen according to the sort of the alkylbenzene (b) used for the reaction. A series of these operations in the preparation of the solid catalyst component are usually carried out in the absence of air and moisture to prevent any deterioration of the quality of the solid catalyst component.

The solid catalyst component thus obtained may be washed further, if necessary, with an inert organic solvent such as n-heptane. The solid catalyst component is used as such for the preparation of an olefin polymerization catalyst or may be stored in dry state, in wet state or in an inert organic solvent for a prolonged period of time without any reduction in its performance.

The solid catalyst component thus prepared is combined with the silicon compound (B) and the organoaluminum compound (C) to form an olefin polymerization catalyst. In the preparation of the catalyst, the organoaluminum compound (C) is used in an amount of 1–1000, preferably 10–500 in terms of a molar ratio to the titanium atom contained in the solid catalyst component (A). On the other hand, the silicon compound (B) is used in an amount of 0.01–0.5 in terms of a molar ratio to the organoaluminum compound (C).

If the amount of the organoaluminum compound (C) is less than 1 in terms of the molar ratio, the catalyst performance of the resultant catalyst will be reduced. On the other hand, no additional advantage will be obtained if the amount exceeds 1000 in terms of the molar ratio. Thus, the upper limit of the amount of the organoaluminum compound (C) is set only for economical reasons. If the amount of the silicon compound (B) is less than 0.01 in terms of the molar ratio, isotacticity of the resultant polymer will be reduced, i.e. the yield of the crystalline polymer will be decreased. On the other hand, if the amount of the silicon compound (B) exceeds 0.5 in terms of the molar ratio, an undesirable problem will arise in the catalytic activity of the resultant catalyst.

The polymerization of olefins by the aid of the catalyst of the present invention can be carried out according to a usual method for gas or bulk polymerization in the absence of an organic solvent or for slurry polymerization in the presence of an organic solvent. The olefin utilizable for the polymerization is $C_1$–$C_4$ α-olefins and involves ethylene, propylene, 1-butene and a mixture of these olefins. Such olefin can be used in either gaseous or liquid state. The polymerization temperature adopted in this case is lower than 200° C., preferably lower than 100° C. while the polymerization pressure is less than 100 kg/cm$^2$.G, preferably less than 50 kg/cm$^2$.G. These conditions generally vary according to the sort of olefins, the type of polymerization adopted and can be selected suitably by those skilled in the art, taking the various factors for polymerization into consideration.

In case the polymerization of olefins is carried out with the aid of the catalyst of this invention, the resultant polymers have a significantly high stereoregularity. In the production of polyolefins in commercial scale, the bulk density of the produced polymer is taken up as a very important problem in view of the capacities of the production in the polymerization apparatus and of the after-treatments. The catalyst of this invention is also excellent in the aspect of producing polymers of high bulk density.

It is one of the characteristic features of this invention that the amount of titanium tetrachloride used for the preparation of the solid catalyst component is extremely small as compared with the prior art olefin polymerization catalysts. Titanium tetrachloride easily undergoes decomposition by the action of oxygen and moisture in the air to evolve gaseous hydrogen chloride which is very corrosive to the apparatus used and hazardous to human health so that the handling of this material is tremendous. Accordingly, decrease in the amount of titanium tetrachloride attained by the present invention brings about a great industrial advantage in the preparation of the solid catalyst component, especially in the aspects of reduction of production cost, easiness in the operations and prevention of any environmental pollution.

As the catalyst of this invention exhibits a very high level of activity never expected from the prior arts, the residual amount of the catalyst in the resultant polymer can be controlled to an extremely low level. Accordingly, the amount of a residual chlorine in the resultant polymer is extremely small so that any influence of chlorine on the polymer can be eliminated to such a degree that any deashing treatment is quite unnecessary as after-treatment. Further, the catalyst of this invention is devoid of an ester of an aromatic carboxylic acid such as benzoic esters so that the problem of "odor" in the resultant polymer is solved in the present invention. In the so-called highly active supported catalysts for the polymerization of olefins, there is a common drawback shown by considerable reduction in activity per unit time of the catalyst with the lapse of time. In the catalyst of this invention, reduction in the activity with the lapse of time is extremely low so that the catalyst can advantageously be used even in such case that the polymerization time must be extended for copolymerization.

It is generally admitted in the production of olefin polymers in industrial scale, that hydrogen is allowed to be co-existent in the polymerization system to control the melt index of the resultant polymer. However, the prior art catalyst comprising a catalyst component involving magnesium halide as carrier and an ester of a monocarboxylic acid has such a drawback that its activity and stereospecific performance are seriously deteriorated in the co-existence of hydrogen in the polymerization system. In contrast, the catalyst of the present invention achieves a significant merit that its catalytic activity and stereospecific performance are scarcely deteriorated in case of performing the polymerization of olefins in the co-existence of hydrogen even if the melt index of the resultant polymer is extremely high. Such a technical effect is strongly demanded by those skilled in the art. Thus, the catalyst of the present invention contributes greatly in the production of stereoregular olefin polymers with a high bulk density in a higher yield.

The present invention will now be illustrated in more detail by way of Examples and Comparative Example.

EXAMPLE 1

(A) The preparation of a solid catalyst component:

In a 200 ml round-bottomed flask equipped with a stirrer, the air in which had been substituted sufficiently with nitrogen, were placed 10 g of diethoxymagnesium and 80 ml of toluene to form a mixture in suspended state. To the suspension thus formed was added 20 ml of TiCl$_4$. The mixture was heated to 90° C. and was added with 2.7 ml of di-n-butyl phthalate. The mixture was heated to 115° C. and reacted for 2 hours with stirring. After completion of the reaction, the reaction mixture was washed two times each with 100 ml of toluene, maintained at 90° C. To the solid matter thus obtained were added 20 ml of fresh TiCl$_4$ and 80 ml of toluene, and the mixture was reacted for 2 hours with stirring at 115° C. After completion of the reaction, the reaction mixture was washed ten times each with 200 ml of n-heptane maintained at 40° C. The content of titanium in the solid catalyst component obtained was determined as 2.61% by weight.

(B) Polymerization:

In a 2.0 l autoclave equipped with a stirrer, the air in which had been replaced entirely by nitrogen, were placed 700 ml of n-heptane. The autoclave was charged successively with 301 mg of triethylaluminum, 64 mg of phenyltriethoxysilane and the solid catalyst component in an amount of 0.2 mg in terms of titanium, while maintaining the nitrogen atmosphere. Into the autoclave was then charged 150 ml of hydrogen and the mixture was heated to 70° C. Gaseous propylene was introduced into the autoclave and subjected to polymerization for 4 hours while maintaining the pressure at 6 kg/cm$^2$.G.

After the polymerizaion, the resultant solid polymer was collected by filtration and warmed at 80° C. under reduced pressure for drying. On the other hand, the filtrate was concentrated to obtain a polymer having been dissolved in the polymerization solvent. The solid polymer was extracted with boiling n-heptane for 6 hours to obtain a polymer insoluble in n-heptane. Designating the amount of the polymer dissolved in the polymerization solvent as (A), the amount of the solid polymer as (B) and the amount of the polymer insoluble in n-heptane as (C), the polymerization activity (D) per solid catalyst component can be calculated according to the following formula:

$$(D) = \frac{[(A) + (B)] \,(g)}{\text{Amount of the solid catalyst component (g)}}.$$

The yield (E) of the crystalline polymer is calculated according to the following formula:

$$(E) = \frac{(C)}{(B)} \times 100(\%).$$

The yield (F) of the total crystalline polymer is calculated according to the following formula:

$$(F) = \frac{(C)}{(A) + (B)} \times 100(\%).$$

A result of the polymerization is shown in Table 1 wherein the content of residual chlorine is designated as (G), the melt index of the polymer as (H) and the bulk density as (I).

EXAMPLE 2

An experiment was carried out in the same manner as described in Example 1 except that the polymerization time was 6 hours. A result of the experiment is shown in Table 1.

EXAMPLE 3

An experiment was carried out in the same manner as described in Example 1 except that the amount of toluene used was 60 ml and the amount of TiCl$_4$ used was 40 ml. The content of titanium in the solid catalyst component obtained was 2.69% by weight. An experiment for polymerization was carried out in the same manner as described in Example 1. A result of the experiment is shown in Table 1.

EXAMPLE 4

The preparation of a solid catalyst component was carried out in the same manner as described in Example 1 except that 2.4 ml of di-n-propyl phthalate was used in place of di-n-butyl phthalate. The content of titanium in the solid catalyst component obtained was 2.74% by weight. An experiment for polymerization was carried out in the same manner as described in Example 1. A result of the experiment is shown in Table 1.

EXAMPLE 5

The preparation of a solid catalyst component was carried out in the same manner as described in Example 1 except that the same amount of xylene was used in place of toluene. The content of titanium in the solid catalyst component obtained was 2.50% by weight. An experiment for polymerization was carried out in the same manner as described in Example 1. A result of the experiment is shown in Table 1.

COMPARATIVE EXAMPLE (A) The preparation of a solid catalyst component:

In a 200 ml round-bottomed flask equipped with a stirrer, the air in which had been substituted sufficiently with nitrogen, were placed 5.0 g of diethoxymagnesium, 2.0 g of dibutyl phthalate and 50 ml of methylene chloride to form a mixture in suspended state. The mixture was stirred for one hour under reflux. The suspension thus formed was introduced under pressure into a 500 ml round-bottomed flask equipped with a stirrer and charged with 200 ml of TiCl$_4$ kept at room temperature. The mixture was heated to 90° C. and reacted for 2 hours with stirring. After completion of the reaction, the reaction mixture was washed ten times each with 200 ml of n-heptane maintained at 40° C. To the solid matter thus obtained was added 200 ml of fresh TiCl$_4$, and the mixture was reacted for 2 hours with stirring at 90° C. After completion of the reaction, the reaction mixture was cooled down to 40° C. and then washed repeatedly with 200 ml of n-heptane until chlorine was no longer detected in the washing liquid, whereupon the washing treatment was finished to yield a solid catalyst component. The content of titanium in the solid catalyst component obtained was determined as 3.66% by weight.

(B) Polymerization:

In a 2.0 l autoclave equipped with a stirrer, the air in which had been replaced entirely by nitrogen, were placed 700 ml of n-heptane. The autoclave was charged successively with 301 mg of triethylaluminum, 32 mg of phenyltriethoxysilane and the solid catalyst component in an amount of 0.3 mg in terms of titanium, while maintaining the nitrogen atmosphere. Into the autoclave was then charged 300 ml of hydrogen and the mixture was heated to 70° C. Gaseous propylene was introduced into the autoclave and subjected to polymerization for 4 hours while maintaining the pressure at 6 kg/cm$^2$.G. A result of the experiment is shown in Table 1.

TABLE 1

|  | Example | | | | | Comparative Example |
|---|---|---|---|---|---|---|
|  | 1 | 2 | 3 | 4 | 5 |  |
| Amount of the polymer dissolved in the polymerization solvent (A) (g) | 2.3 | 3.2 | 2.6 | 2.4 | 2.2 | 6.6 |
| Amount of the solid polymer (B) (g) | 207.2 | 290.1 | 211.2 | 208.6 | 201.1 | 235 |
| Amount of the polymer insoluble in boiling n-heptane (C) (g) | 205.5 | 287.3 | 209.6 | 207.0 | 199.9 | 232 |
| Polymerization activity per solid catalyst component (D) | 27300 | 38300 | 28800 | 28900 | 25400 | 29460 |
| Yield of the crystalline polymer (E) (%) | 99.2 | 99.0 | 99.2 | 99.2 | 99.4 | 98.7 |
| Yield of the total crystalline polymer (F) (%) | 98.1 | 98.0 | 98.0 | 98.1 | 98.3 | 96.0 |
| Amount of the residual chlorine in the resultant polymer (G) (ppm) | 21 | 15 | 20 | 20 | 23 | 19 |
| MI of the resultant polymer (H) | 3.6 | 2.9 | 3.2 | 5.1 | 2.7 | 28.6 |
| Bulk density of the resultant polymer (I) | 0.44 | 0.45 | 0.45 | 0.43 | 0.45 | 0.37 |

It is understood that the preceding representative examples may be varied within the scope of the present specification both as to reactants and reaction conditions, by one skilled in the art to achieve essentially the same results.

As many widely different embodiments of this invention may be made without departing from the spirit and scope thereof, it is to be construed that this invention is not limited to the specific embodiments thereof except as defined in the appended claims.

What is claimed is:

1. A solid olefin polymerization catalyst component prepared by
   (i) washing a solid substance with an alkylbenzene
       said solid substance having been prepared by reacting diethoxymagnesium suspended in an alkylbenzene, with titanium tetrachloride in an amount of less than ½ by volume ratio of an alkylbenzene, and adding a phthalic diester at a temperature within the range of 80°–135° C., and
   (ii) reacting said solid substance in the presence of an alkylbenzene with titanium tetrachloride in an amount of less than ½ by volume of said alkylenzene to form said solid olefin polymerization catalyst component.

2. A solid catalyst component according to claim 1, wherein said solid substance has been obtained by suspending diethoxymagnesium in an alkylbenzene, adding to the suspension titanium tetrachloride in an amount less than ½ by volume ratio of said alkylbenzene to form a mixture, adding a phthalic diester to said mixture after elevating the temperature of said mixture above 80° C., and reacting said mixture at a temperature within the range of 80°-135° C.

3. A solid catalyst component according to claim 1, wherein said solid substance has been obtained by suspending diethoxymagnesium in said alkylbenzene, adding to the suspension titanium tetrachloride in an amount less than ½ by volume ratio of said alkylbenzene and said phthalic diester at room temperature to form a mixture and thereafter reacting said mixture at a temperature within the range of 80°-135° C.

4. A solid catalyst component according to any one of claims 1, 2 and 3, wherein said alkylbenzene is selected from the group consisting of toluene, xylene, ethylbenzene, propylbenzene and trimethylbenzene.

5. A solid catalyst component according to any one of claims 1, 2 and 3, wherein said phthalic diester is selected from the group consisting of dimethyl phthalate, diethyl phthalate, dipropyl phthalate, diisopropyl phthalate, dibutyl phthalate, diisobutyl phthalate, diamyl phthalate, diisoamyl phthalate, ethyl propyl phthalate, ethyl butyl phthalate and ethyl isobutyl phthalate.

6. A solid catalyst component according to any one of claims 1, 2 and 3, wherein said phthalic diester is in an amount of 0.1-1.0 g per gram of the diethoxymagnesium.

7. A solid catalyst component according to any one of claims 1, 2 and 3, wherein said titanium tetrachloride is used in an amount of at least 1.0 g per gram of the diethoxymagnesium.

8. A solid catalyst component according to any one of claims 1, 2 and 3, wherein said reactions are conducted in the range of from 10 minutes to 10 hours.

9. An olefin polymerization catalyst which comprises:
(A) the solid catalyst component for olefin polymerization catalyst as set forth in any one of the claims 1, 2 and 3,
(B) a silicon compound of the general formula:

$$SiR_m(OAlk)_{4-m}$$

wherein R is selected from the group consisting of an alkyl group, a cycloalkyl group, an aryl group and a vinyl group; Alk is an alkyl group; and m is 0 or an integer of 1-3, with the proviso that when R is an alkyl group, R may be identical with Alk and when m is 1, 2 or 3, the R groups and/or the Alk groups may respectively be identical or different, and
(C) an organoaluminum compound.

10. An olefin polymerization catalyst according to claim 9, wherein the silicon compound is selected from the group consisting of a phenylalkoxysilane, an alkylalkoxysilane, a phenylalkylalkoxy silane, a cycloalkylalkoxysilane and a cycloalkylalkylalkoxysilane.

11. An olefin polymerization catalyst according to claim 9, wherein the organoaluminum compound is selected from a trialkylaluminum, a dialkylaluminum halide, an alkylaluminum dihalide and a mixture thereof.

12. An olefin polymerization catalyst according to claim 9, wherein the organoaluminum compound is used in an amount of 1-1000 in terms of a molar ratio to the titanium atom contained in the solid catalyst component.

13. An olefin polymerization catalyst according to claim 9, wherein the silicon compound is used in an amount of 0.01-0.5 in terms of a molar ratio to the organoaluminum compound.

* * * * *